United States Patent [19]

Cribbs et al.

[11] 4,236,221
[45] Nov. 25, 1980

[54] SCAN CONVERTER

[75] Inventors: Robert W. Cribbs, Placerville; Gary L. Engle, Fair Oaks, both of Calif.

[73] Assignee: Litton Industrial Products, Inc., Beverly Hills, Calif.

[21] Appl. No.: 959,975

[22] Filed: Nov. 13, 1978

[51] Int. Cl.³ .................... G01N 29/00; G01S 15/02
[52] U.S. Cl. .................... 364/515; 358/112; 364/516; 128/660
[58] Field of Search ............ 364/515, 514, 516, 517; 358/112; 128/661, 663, 660

[56] References Cited

U.S. PATENT DOCUMENTS

| 4,099,179 | 7/1978 | Hofstein | 358/112 X |
| 4,111,055 | 9/1978 | Skidmore | 358/112 X |
| 4,125,858 | 11/1978 | Hounsfield | 364/515 X |
| 4,135,140 | 1/1979 | Buchner | 358/112 X |
| 4,141,347 | 2/1979 | Green et al. | 358/112 X |

*Primary Examiner*—Edward J. Wise
*Attorney, Agent, or Firm*—Robert A. Seldon

[57] ABSTRACT

A Scan Converter for use with an Ultrasonic Imaging System is disclosed, which permits the buffering of sweep address and video data with relatively fewer bits of information. In essence, the propogation path of the ultrasonic pulses is resolved into a pair of vectoral components while the propogation path media is defined by successive contiguous body segments which are to be respectively displayed as video picture elements. A series of first signals indicate the crossing of segment boundaries in the vectoral direction having the faster rate of boundary crossings. A second signal is produced having a unique valve which indicates a boundary crossing by the pulse in the other vectoral direction. Reflections of the ultrasonic pulse are sampled at a rate determined by the first signals; i.e., the rate at which segment boundaries are crossed in the first vectoral direction. The sample values are held for storage in memory. The memory includes a matrix of memory location associated with respective picture elements. The one coordinate of the memory address is successively incremented with the storage of the respective successive values. The second coordinate of the address is incremented by the unique value of the forementioned second signal; in other words, when a segment boundary is crossed in the slower vectoral direction.

7 Claims, 3 Drawing Figures

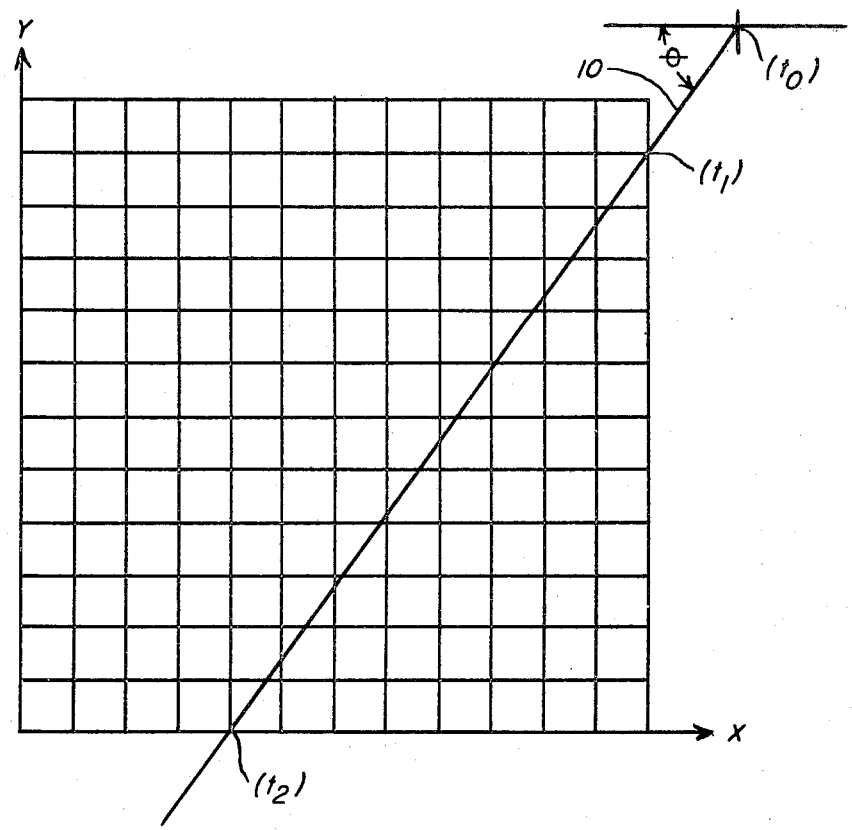
Fig_1
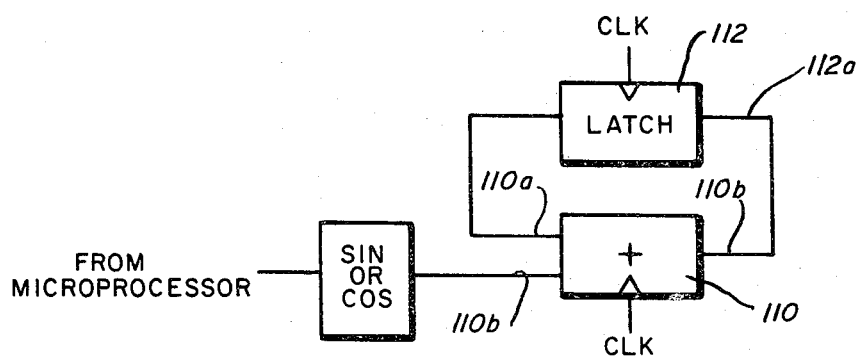
Fig_3

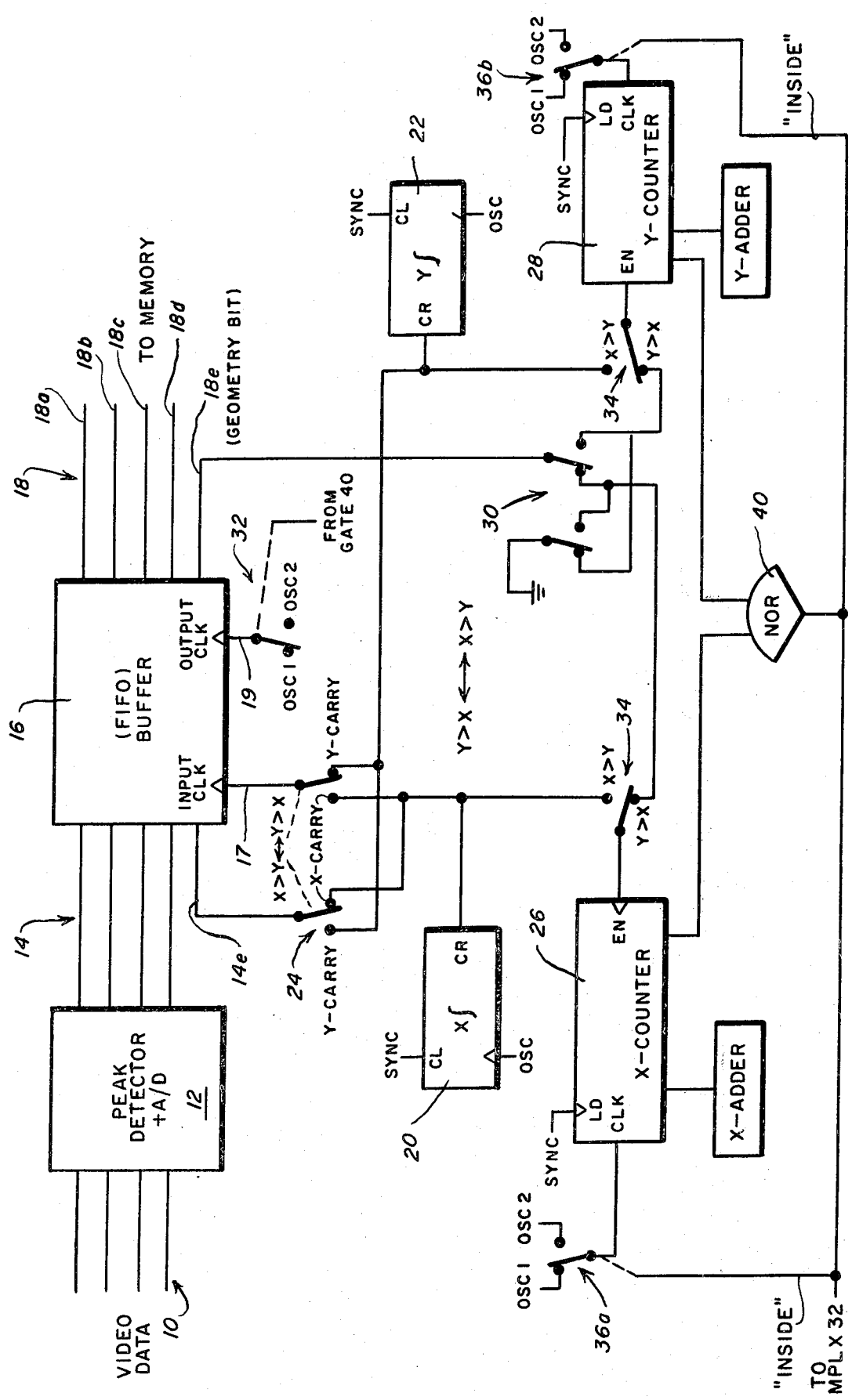
Fig_2

SCAN CONVERTER

FIELD OF THE INVENTION

This invention relates to ultrasonic imaging systems and, more specifically, to the storage of data in such systems for subsequent display.

The stored data is representative of the amplitudes and arrival times of pulse reflections produced by media discontinuities in the propagation path of ultrasonic pulses launched into an examined region. As known in the art, the amplitude of the reflection is indicative of the degree of density change at the transition interface while the return time signifies the depth of the discontinuity into the body.

The reflections are sensed by a transducer (typically the transducer which launched the pulse into the body) and converted to representative electronic data signals. The data is written into memory for subsequent reading and display on such means as a video monitor.

As known in the art, it is highly desirable to provide an imaging system having the highest possible pulse repetition rate so that scanning may be reformed quickly without loss of resolution. A major limitation, however, has been the necessity or receiving and processing the reflections from the last transmitted pulse without interfering with the data from the next pulse and without an impractical quantity or complexity of hardware. During the interval between launched pulses, hereinafter referred to as "repetition interval", incoming data must be written into memory and stored data must be read out of memory for display. Repetition interval in the inverse of repetition rate.

The timing of the READ operation is essentially determined by the video scan pattern. The standard video monitor includes a screen comprising a 512×512 matrix of picture elements (pixels) which, together, form a frame. The frame comprises two interlaced fields of 256 lines each. The beam sweeps essentially horizontally through the 512 pixels of each line every 520 $\mu$sec, retracing vertically every 16.6 milliseconds. Data for each pixel must accordingly be available when the beam passes through that pixel.

For the writing of data, on the other hand, the constraints depend on the arrival time of incoming data signals, and the scale factor. The delay between arrival time and launching time of the pulse is determined by the propagation speed of the pulse and reflections in the body. The scale factor determines the speed at which the data must be written. For example, at a scale factor of 40 cm, each pixel represents (40 cm/512) pixels=0.0078 cm of the interior body. The area of the body represented by each pixel changes with scale factor, naturally, so that at a scale factor of 10 cm, each pixel represents 0.0195 cm. Thus, the ultrasonic pulse travels across the area represented by one pixel in approximately 1 $\mu$sec at 40 cm, and 250 n sec at 10 cm, thereby generating data at different rates.

Although it is desirable to provide a respective RAM address for the information each pixel, currently available random access memory chips (RAM's) cannot always be accessed as quickly as the data is coming in owing to inherent design limitations. At scale factor of 10 cm, for example, the launched pulse is crossing a displayed pixel area every 250 n sec, and the RAM's cannot accept the data that quickly. The incoming data must accordingly be buffered and written into the RAM at an acceptable rate, hereinafter referred to as "writing in RAM time".

The buffering also permits a faster pulse repetition rate. Because the data acquisition duty cycle is less than 100% of the repetition interval (i.e. reflections are not received 100% of the time), the data can be buffered and the remaining time used to write the buffered data into memory. For example, at a pulse repetition rate of 1600 Hz, the repetition interval is approximately 600 $\mu$sec. At a scale factor of 10 cm, the incoming data arrives within the first 130 $\mu$sec, but may be written into memory during the remaining portion of the system memory cycle, less the time required for the video READ.

DESCRIPTION OF THE PRIOR ART

In a system utilizing a display having a 16 (i.e. $2^4$) level gray scale, and a 512×512 matrix (i.e. $2^9 \times 2^9$) the following amount of information must be buffered:

| | |
|---|---|
| Gray scale: | 4 bits |
| Sweep addresses: | 9 bits for "X" coordinate |
| | 9 bits for "Y" coordinate |
| | 22 bits |

Buffering all 22 bits of information requires a considerable amount of hardware and time, since 512 22-bit words are used to form the display image.

SUMMARY OF THE INVENTION

The invention now described permits the buffering of the aforementioned sweep address and video data for correct storage of the video data utilizing 5 bits of information so that a 512×5 bit buffer can be used, thereby decreasing hardware requirements and increasing pulse repetition rate.

The pulse propogation path through the examined medium is conveniently defined as a succession of contiguous segments which may be envisioned as corresponding to respective picture elements of a video display. In accordance with the invention, first means are provided for resolving the propagation path of the ultrasonic pulses into a pair of vectoral components. Second means are provided for producing signals indicative of crossings by the pulse of segment boundaries in the vectoral direction having the faster rate of crossing. Third means are provided to produce a signal having a unique value indicative of a boundary crossing in the other vectoral direction.

The input data signal, which is indicative of pulse reflection amplitude, is sampled in response to boundary crossings in the "first" vectoral direction by sampling means responsive to the signals of the second means. These successive data samples may be respectively buffered with the signal value which was produced by the third means at substantially the time the sample was taken.

The successive data samples are then stored in memory for display by accessing the appropriate respective memory location. Means for accessing the appropriate memory location function in the following manner. With the application of successive data samples to the memory, one address co-ordinate is changed to that associated with successively adjacent picture elements in the displayed "fast" vectoral direction. The other address co-ordinate is changed to that associated with successive adjacent picture elements in the other (i.e.

show) vectoral direction in response to the presence of the unique signal value from the third means.

In the example provided above wherein only five (5) bits of information are described as being used, four (4) bits are for the video information. The fifth bit provides the indication of slow direction boundary crossing by, for example, being a '1' when a boundary has been crossed and a '0' when no such boundary crossing has occurred. The aforementioned "other address co-ordinate" is accordingly changed when the fifth bit of information is a '1'.

Further details are set forth in the following description of a Preferred Embodiment of which the figures form a part.

BRIEF DESCRIPTION OF THE DRAWING

In the drawing:

FIG. 1 is a graphic illustration of a vector representing the pulse propagation path, and a RAM matrix, or alternately, the imaged display region and superimposed pixel matrix, FIG. 2 is a block diagram of a scan converter constructed in accordance with the invention.

FIG. 3 is a block diagram representation of the digital integrator shown in FIG. 2.

DESCRIPTION OF THE PREFERRED EMBODIMENT

FIG. 1 is a graphic illustration of a RAM matrix which may also be conveniently used to illustrate the corresponding pixel matrix of a video screen. For convenience, the imaged body region can be discussed in terms of a superimposed pixel matrix so that a mapping of body pixels into respective video pixels can be said to take place and FIG. 1 can also represent a matrix of body pixels. For simplicity, a 12×12 matrix is shown although application to any size RAM or video matrix will be obvious. A vector 10 representing a propagation path of the ultrasonic pulses is shown. The pulse is launched at time $t_o$, enters the displayed region of the body at $t_1$ and exits from the displayed region at $t_2$. If it is desirable to store data only between the time $t_1$ and $t_2$, buffering may not be required when the vector is outside the displayed region. Once inside the boundary, however, the data is buffered so as to be written in RAM time; in the preferred embodiment, two pixels of information are stored every 1726 nsec. Thus 512 data words respectively including video and sweep information are generated in real time and buffered for storage in RAM time. The buffered sweeps information associated with each word provides for the correct two dimensioned positioning of the respective video data in the RAM array of FIG. 1.

To assure such correct positioning in accordance with the present invention, "fast" and "slow" scan axes, defined by the orientation of the transducer are first identified. In FIG. 1, for example, the vector 10 is shown crossing 12 pixel boundaries in the "Y" direction and 9 pixel boundaries in the "X" direction. Because the boundaries in the "Y" direction are crossed at a faster rate than those in the "X" direction, the "Y" axis is the "fast" or controlling axis.

The rate of boundary crossings in the fast direction is used as the system sample clock rate so that successively sampled reflections represent data from successively crossed body pixels in the fast direction. The sweep information for the fast direction is therefore inherent in the data word order since each word read out of the buffer will represent video information for the next pixel in the fast direction; the RAM address may be successively incremented in the fast direction as each word is outputted from the buffer.

The buffered information associated with each word and required for addressing the RAM in the "slow" direction may simply be a fifth bit buffered with the four video bits. This "geometry bit" will for example, be '1' when the data is the first sampled after a boundary crossing in the slow direction; otherwise, the bit will be a '0'.

In summary, when the buffered data is to be written into memory, the correct location within the RAM matrix is determined by both the order of the data within the buffer and the value of the geometry byte. Because each video word was formed by sampling the acoustic input when data from a new body pixel in the fast direction was received, the RAM address is merely incremented in the fast direction for each successive word. The address is correspondingly incremented in the slow direction on only when the buffered geometry byte of a word indicates that a slow boundary had been crossed by the vector 10 when the respective sampled data was generated in the body.

Turning to FIG. 2, a block diagram representation of the system is shown. As explained above, owing to the novel manner by which data is buffered, the system provides high pulse repetition rates and yet writes data into memory at a rate compatible with available memory chips.

Incoming signals 10 indicative of reflection amplitudes are first digitized by an analog/digital converter 12 which may include a peak detector so that maximum amplitude of each reflection will be sampled. The resulting data signal 14 is applied to a one pulse buffer device 16 which may conveniently be a 512×5 "first-in, first-out" (FIFO) buffer. As known in the art, the buffer 16 is responsive to an input clock signal 17 to sample and hold successive input values, and is also responsive to an output clock 19 to reproduce the stored values in sequence. Four bytes 18 a-d of video data 18 representing a 16 level gray scale value, are applied to the image system memory (RAM). The RAM is accessed in a manner hereinafter described so that the video data is stored in locations which may be accessed for later reading in a manner compatible with the scan portion of a video display beam.

The controlling direction and slow direction are determined by comparing the signal magnitudes from sine and cosine potentiometers located in the transducer arm. These components have been used in the past for indicating transducer location and orientation so that further description is unnecessary for the purpose of this disclosure. It may be appreciated with reference to FIG. 1 that:

Sin $\theta$ > cos $\theta$ when $\theta$ > 45° (Y is controlling)
Sin $\theta$ > cos $\theta$ when $\theta$ > 45° (X is controlling)

Accordingly, a binary "select" signal axis indicative of the existing relationship of cosine and sine may be produced by a comparator to identify the appropriate axis as the controlling axis; this select signal is applied to multiplexers 24, 30 to accordingly couple the x and y axis circuitry hereinafter described.

Regardless of which axis is controlling, the crossing of body pixel boundaries by the ultrasonic pulse is determined similarly for the x and y directions by respective digital integrators 20, 22. As illustrated in FIG. 3, the x and y integrators 20, 22 are respectively formed by adder circuits 110, having inputs coupled at 110a, latches 112, and at 110b to the system microprocessor to receive the values of the cosine and sine for the particular $\theta$ value. The adder outputs 110b are coupled to the latch inputs 112a.

In operation, the integrators 20, 22 are cleared by a SYNC signal which indicates the launching of an ultrasonic pulse into the examined body. The adder and latch are then clocked by a rate determined by display scale factor so that the y integrator output will have successive values proportional to $\sin \theta$, $2 \sin \theta$, $3 \sin \theta$, etc. and the x-integrator output will be proportional to $\cos \theta$, $2 \cos \theta$, etc. In both cases, the generation of a carry output by the integrator is indicative of a crossed pixel boundary. It may be noted that the frequency at which the carry signals are produced varies with $\theta$.

The multiplexer 24 couples the carry output of the controlling integrator as the sample clock of the buffer 16 and the carry output of the slow integrator as the geometry bit signal 14e to the buffer 16 in accordance with the bindary select signal. By this method, each successive word in the buffer 16 represents data sampled from a new body pixel in the fast direction since the sample was obtained with the crossing of a pixel boundary. The value of the geometry byte sampled with each piece of data, is stored as part of the buffered word so that each word contains the information necessary to determine whether a pixel boundary was entered in the slow direction.

Once the video words and associated geometry bits have been clocked into the FIFO 16, they can be outputted into memory during appropriate periods within the system memory cycle. Preferably, the FIFO can hold 512 words, so that the information for the entire $512 \times 512$ pixel matrix can be stored, if necessary, before outputting into memory takes place.

As outlined above, the memory will be accessed at an address which is automatically incremented in the fast direction subsequent to the writing of each data word because each sample was obtained when a new body pixel boundary was crossed. The memory address will be incremented in the slow direction in accordance with the geometry bit 18e value.

Memory locations addresses are tracked by means of counters 26, 28 respectively associated with the X and Y axis. A multiplexer 34 responsive to the bindary signal is used to constantly enable the controlling counter and couples the geometry bit 18e to the enabling circuitry of the slow counter. At the launching of the ultrasonic pulse, the counters 26, 28 are loaded by the SYNC signal with initial counts derived from the system microprocessor in accordance with the x, y coordinates of the transducer with regard to the body. The counters 26, 28 may be conveniently clocked by the output clock of the FIFO 16. The constantly enabled controlling counter is thereby incremented with the output of each buffered word so that the memory address is successively incremented in the first direction, while the slow counter increments only when enabled by the geometry bit.

As indicated previously, it is necessary to insure that the speed with which the RAM memory is accessed is within its inherent limitations. This limitation need not limit performance of the present system, however, when the vector 10 (FIG. 1) lies outside the display boundaries. Accordingly, the address counters may be incremented with a fast clock when the accessed memory locations contain data lying outside the display boundaries as, for example, when a magnified display of a consequently smaller region is displayed. A multiplexer 32 may be used to selectively couple with a system clock or a slower clock as the FIFO 16 output clock 19.

Similarly, the counters 26, 28 may be enabled by respective multiplex means 36a, 36b so that the fast and slow counters are respectively incremented by the fast and slow integrator carries until the vector is inside the display boundary, and thereafter by the constant enabling signal and geometry bit, respectively, when the vector is inside the boundaries.

The "inside" signal is produced in the preferred embodiment, by using a 12 byte hexadecimal 2's compliment counter for the x-counter 26 and y-counter 28. Nine bytes are required for address information since $2^9 = 512$, and the three most significant bytes (MSB) are used to define the display region. As shown below, the vector will thereby be inside the display region only when all 3 MSB's are '0'.

As known in the art, the MSB in a 2's complement configuration has a value of $-2^n$, where the MSB is the $n+1$ byte, while all other bytes carry their normal positive weight. Any word having all '1' bytes will therefore equal $-1$:

$$1111 = -2^3 + 7 = -1$$

$$111111 = -2^5 = 31 = +1$$

If the correlation between the pixel matrix and counter numbers is set up as shown below,

| | display region | | | | | | |
|---|---|---|---|---|---|---|---|
| Pixel no: | −2048 | −1024 | −512 | 0 | 511 | 1023 | 2017 |
| Hex no: | 800 | 600 | E00 | 0 | 1FF | 3FF | 7FF | it may be appreciated that at least one of the 3 MSB's will be '1' only outside the display region. $512_{10} = 0001\ 1111\ 1111$, while $513_{10} = 0011\ 1111\ 1111$. Similarly $-1_{10} = 1111\ 1111\ 1111$ with the hexidecimal number decementing to $1000\ 0000\ 0000$ at $-2048_{10}$.

Accordingly, the 3MSB's of each counter 26, 28 are coupled to respective inputs of an exclusive NOR gate 40 so that the "inside" signal is generated only when one of the 6 MSB's are '1'.

While the foreging description represents a preferred embodiment of the invention, many modifications and variations will be apparent to those skilled in the art. Accordingly, the invention is to be defined only by the appended claims, which are to be interpreted in the context.

We claim:

1. In an imaging system of the type including
   video display means including a matrix of video picture elements,
   memory means having an array of addressable locations for storing data for respective picture elements, the locations being accessed by the addressing of a co-ordinate pair of address lines and,
   transducer means for launching an energy pulse into a body and for receiving pulse reflections from discontinuities in the pulse propogation path, the transducer means including means for producing an input signal indicative of the reflection amplitudes, the propagation path media being defined by successive contiguous body segments displayed as respective picture elements, the improvement comprising:

means for resolving the propogation path into a pair of vectoral components;

means for producing respective first signals indicative of segment boundary crossings by the pulse in the vectoral direction having the faster rate of boundary crossings;

means for producing a second signal having a unique value indicative of a boundary crossing the pulse in the other vectoral direction;

means responsive to the first signals for sampling the input signal value;

means for applying the successively sampled input signal values to the memory means for storage as data signals; and address means for accessing the memory location associated with the appropriate picture element, the address means being responsive to the application of each data signal to change one co-ordinate of the address to that associated with successively adjacent picture elements in the fast vectoral direction and being further responsive to the unique values of the second signal to change the other co-ordinate of the address to that associated with successive adjacent picture elements in the other vectoral direction.

2. The improvement of claim 1 wherein the system includes a transducer arm mounted for angular positioning, and the first signal-producing means includes means responsive to the position angle for producing a select signal indicative of the predominant vectoral direction, a first integrator responsive to a series of clock pulses to produce a signal having a value proportional to successive integral multiples of the ratio of path length to one vector length and to produce a first carry signal when the multiple value is greater than unity, a second integrator responsive to a series of clock pulses to produce a signal having a value proportional to successive integral multiples of the ratio of the path length and the other vector length and to produce a second carry signal when the multiple value is greater than unity, and multiplex means responsive to the select signal and arranged to couple the integrator associated with the predominant vector to the sample means as the first signal and to couple the integrator associated with the other vector to the address means as the second signal.

3. The improvement of claim 2 including first means responsive to the position angle for producing a pair of signals proportional to respective rectilinear vector components of the imaged propogation path; and comparator means for producing the select signal indicative of the greater vector component.

4. The improvement of claim 3 wherein the first angle-responsive signal producing means includes a sin/cos potentiometer having its wiper adapted for coupling to the transducer arm for angular motion-actuated movement.

5. The improvement of claim 2 wherein the first integrator means includes microprocessor means responsive to the position angle to produce sine values relates to the angle, adder means for receiving the sine value at each clock pulse and reproducing an integrator output signal value proportional to the sum of the sine value and a second input signal, and latch means for receiving and holding the integrator output signal to apply the summation signal to the adder as the second input signal, the integrator being operable at each clock pulse so that with each clock pulse, the adder means repetitively adds the sine value to the produced output value.

6. The improvement of claim 2 wherein the second integrator means includes microprocessor means responsive to the position angle to produce cosine values related to the angle, adder means for receiving the cosine value at each clock pulse and reproducing an integrator output signal value proportional to the sum of the cosine value and a second input signal latch means for receiving and holding the integrator output signal to apply the summation signal to the adder as the second input signal, the integrator being operable at each clock pulse so that with each clock pulse, the adder means repetitively adds the cosine value to the produced output value.

7. The improvement of claim 1 including first in-first out buffer means responsive to the first signals to sample and hold the input signal value and the second signal value and further responsive to an output clock to apply the held values to the memory means for storage as data and to apply the associated second signal value to the address means.

* * * * *

UNITED STATES PATENT AND TRADEMARK OFFICE
CERTIFICATE OF CORRECTION

PATENT NO. : 4,236,221
DATED : November 25, 1980
INVENTOR(S) : Robert W. Cribbs et al.

It is certified that error appears in the above—identified patent and that said Letters Patent is hereby corrected as shown below:

Column 4, line 57, " > ", two occurrences, should read -- < --.

Signed and Sealed this

Thirtieth Day of March 1982

[SEAL]

Attest:

*Attesting Officer*

GERALD J. MOSSINGHOFF

*Commissioner of Patents and Trademarks*